United States Patent
Brooks et al.

(10) Patent No.: US 10,452,511 B2
(45) Date of Patent: Oct. 22, 2019

(54) SERVER HEALTH CHECKING

(71) Applicant: INTERNATIONAL BUSINESS MACHINES CORPORATION, Armonk, NY (US)

(72) Inventors: Michael D. Brooks, Southampton (GB); James A. Harrison, Warwick (GB); Robert C. Jones, Southampton (GB); Philip R. Lee, Winchester (GB); Catherine M. Moxey, Newbury (GB); Mayur Raja, Chandlers Ford (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 201 days.

(21) Appl. No.: 15/142,668

(22) Filed: Apr. 29, 2016

(65) Prior Publication Data
US 2017/0315897 A1    Nov. 2, 2017

(51) Int. Cl.
*G06F 11/34* (2006.01)
*H04L 12/26* (2006.01)
*H04L 12/24* (2006.01)

(52) U.S. Cl.
CPC ...... *G06F 11/3428* (2013.01); *H04L 41/0893* (2013.01); *H04L 41/5009* (2013.01); *H04L 43/08* (2013.01); *G06F 2201/81* (2013.01); *G06F 2201/835* (2013.01); *H04L 43/16* (2013.01)

(58) Field of Classification Search
CPC .... G06F 11/3428; H04L 43/08; H04L 47/823; H04L 41/5009; H04L 41/0893; H04L 43/16
See application file for complete search history.

(56) References Cited

U.S. PATENT DOCUMENTS

| | | | |
|---|---|---|---|
| 8,005,644 B1 | 8/2011 | Evans et al. | |
| 8,261,278 B2 | 9/2012 | Peracha | |
| 8,510,430 B2 | 8/2013 | McKinney | |
| 8,856,312 B2 | 10/2014 | MacLellan et al. | |
| 9,069,889 B2 | 6/2015 | Addison et al. | |
| 2008/0097801 A1* | 4/2008 | MacLellan | G06F 11/3409 709/224 |
| 2010/0287019 A1* | 11/2010 | Guo | G06F 11/3442 709/224 |
| 2011/0098973 A1 | 4/2011 | Seidman | |
| 2013/0254260 A1* | 9/2013 | Stevens | H04L 63/20 709/203 |

(Continued)

OTHER PUBLICATIONS

IBM, "IBM CICS Performance Analyzer for z/OS, Version 5.2," Oct. 19, 2015, pp. 1-7.

*Primary Examiner* — Tonia L Dollinger
*Assistant Examiner* — Steven C Nguyen
(74) *Attorney, Agent, or Firm* — William A. Kinnaman, Jr.; Heslin Rothenberg Farley & Mesiti P.C.

(57) ABSTRACT

Generating a performance policy for a server. A plurality of system metrics of a first server is monitored, and a benchmark for the plurality of system metrics based on the monitored plurality of system metrics is stored. The benchmark indicates desirable system metrics of the first server. An operating policy for a second server is generated from the stored benchmark. The operating policy includes desirable system metrics of the second server based on the desirable system metrics of the first server.

17 Claims, 3 Drawing Sheets

(56) References Cited

U.S. PATENT DOCUMENTS

| | | | | |
|---|---|---|---|---|
| 2014/0019403 A1* | 1/2014 | Harrison | ............... | G06N 5/02 |
| | | | | 706/58 |
| 2014/0207415 A1* | 7/2014 | Bhutani | ............... | G06Q 10/06 |
| | | | | 702/182 |
| 2014/0280926 A1* | 9/2014 | Aguiling | ............ | G06F 11/3433 |
| | | | | 709/224 |
| 2015/0227412 A1* | 8/2015 | Carmel | ............ | G06F 11/0793 |
| | | | | 714/2 |
| 2015/0381433 A1* | 12/2015 | Kimura | ............... | G06F 9/445 |
| | | | | 709/224 |

\* cited by examiner

SERVER HEALTH CHECKING

BACKGROUND

One or more aspects relate, in general, to servers, and in particular to facilitating a health check of a newly installed server, such as a transaction server.

Nowadays, many servers accessible over networks, such as the Internet, mobile communication networks, and so on, offer services, which may be hosted by the server or for which the server acts as an intermediary. Often, such services are of a time-critical nature or at least are expected to be delivered within a certain amount of time, which therefore requires the server to maintain certain performance levels in order to meet performance expectations.

Such servers are commonly referred to as transaction servers. A transaction server manages business transactions over a computer communications network. The transaction server for example may act as an intermediary between a device requesting a particular service and a device providing the requested service. The transaction server can be described to act as glue, holding essential data processing activities together. Further, a transaction server allows an enormous volume of information to remain accurate and ensures transactions are completed without interruption or data corruption. To achieve the foregoing, generally a transaction server provides for "roll back" capability through the implementation of the "ACID" set of properties—namely atomicity, consistency, isolation and durability. Thus, the transaction server is responsible for maintaining high performance, availability and data integrity and ensures that no computer has too much or too little to do.

A server, such as a transaction server, can be a software application executing in memory of a computer forming a composite device, or can be a software application executing in memory of a computer also hosting the execution of other applications, whether in the same process address space or in a separate process address space, such as in a separate virtual machine. An example of a transaction server is IBM CICS online transaction processing application. CICS along with the COBOL programming language has provided the backbone of enterprise mainframe computing for several decades and more recently has been supported in the mid-range and network personal computing environments.

A server, such as a transaction server, is to maintain a desired service level, e.g. a level of service as specified in a service level agreement (SLA), such that transaction services involving the transaction server are sufficiently available and are handled sufficiently quickly. In other words, the transaction server is not to be overloaded or otherwise stressed, i.e. is healthy and stable. In a transaction server environment, the health and stability of the transaction server can be measured according to many different measurable metrics.

Traditionally, metrics were evaluated after degradation of the performance of a transaction server, for example by evaluation of log messages in which abnormal events or conditions have been reported or by using independent monitoring logic to monitor system resources in order to generate an alert or to log a message when a threshold has been exceeded in any given resource, including memory or processor usage. Such performance metrics furthermore could be captured during the operation of the transaction server and analyzed at a later time to retro-reflectively identify poor health of the transaction server. Hence, such traditional approaches were based on detecting poor health of the transaction server, which often meant the consequential performance degradation of the service or transaction handled by the transaction server, which was undesirable.

More recently, predictive methods for predicting transaction server performance failure have been introduced. Such methods rely on comparing a monitored performance metric of the transaction server to a benchmark of performance metrics, which comparison can trigger an alert or a corrective action upon the monitored performance metric falling outside a threshold variance from the benchmark, thus potentially avoiding unwanted performance degradation. Such methods are particularly suitable for transaction servers having well-established benchmarks. However, when creating a new instance of a transaction server, it may be difficult to determine when the new transaction server operates in a healthy manner without avoiding deterioration of the transaction server performance.

SUMMARY

According to an aspect, there is provided a computer-implemented method of generating a performance policy for a server, the method includes monitoring, by a processor, a plurality of system metrics of a first server; storing a benchmark for the plurality of system metrics based on the monitoring the plurality of system metrics, the stored benchmark indicating desirable system metrics of the first server; and generating an operating policy for a second server from the stored benchmark, the operating policy comprising desirable system metrics of the second server based on the desirable system metrics of the first server.

According to another aspect, there is provided a computer program product for generating a performance policy for a server. The computer program product includes a computer readable storage medium readable by a processing circuit and storing instructions for execution by the processing circuit for performing a method. The method includes monitoring a plurality of system metrics of a first server; storing a benchmark for the plurality of system metrics based on the monitoring the plurality of system metrics, the stored benchmark indicating desirable system metrics of the first server; and generating an operating policy for a second server from the stored benchmark, the operating policy comprising desirable system metrics of the second server based on the desirable system metrics of the first server.

According to yet another aspect, there is provided a computer system for generating a performance policy for a server. The computer system includes a memory; and a processor in communication with the memory, wherein the computer system is configured to perform a method. The method includes monitoring a plurality of system metrics of a first server; storing a benchmark for the plurality of system metrics based on the monitoring the plurality of system metrics, the stored benchmark indicating desirable system metrics of the first server; and generating an operating policy for a second server from the stored benchmark, the operating policy comprising desirable system metrics of the second server based on the desirable system metrics of the first server.

Additional features and advantages are realized through the techniques described herein. Other embodiments and aspects are described in detail herein and are considered a part of the claimed aspects.

BRIEF DESCRIPTION OF THE DRAWINGS

Embodiments of the present invention will now be described, by way of example only, with reference to the following drawings, in which.

DETAILED DESCRIPTION

Figure 1:
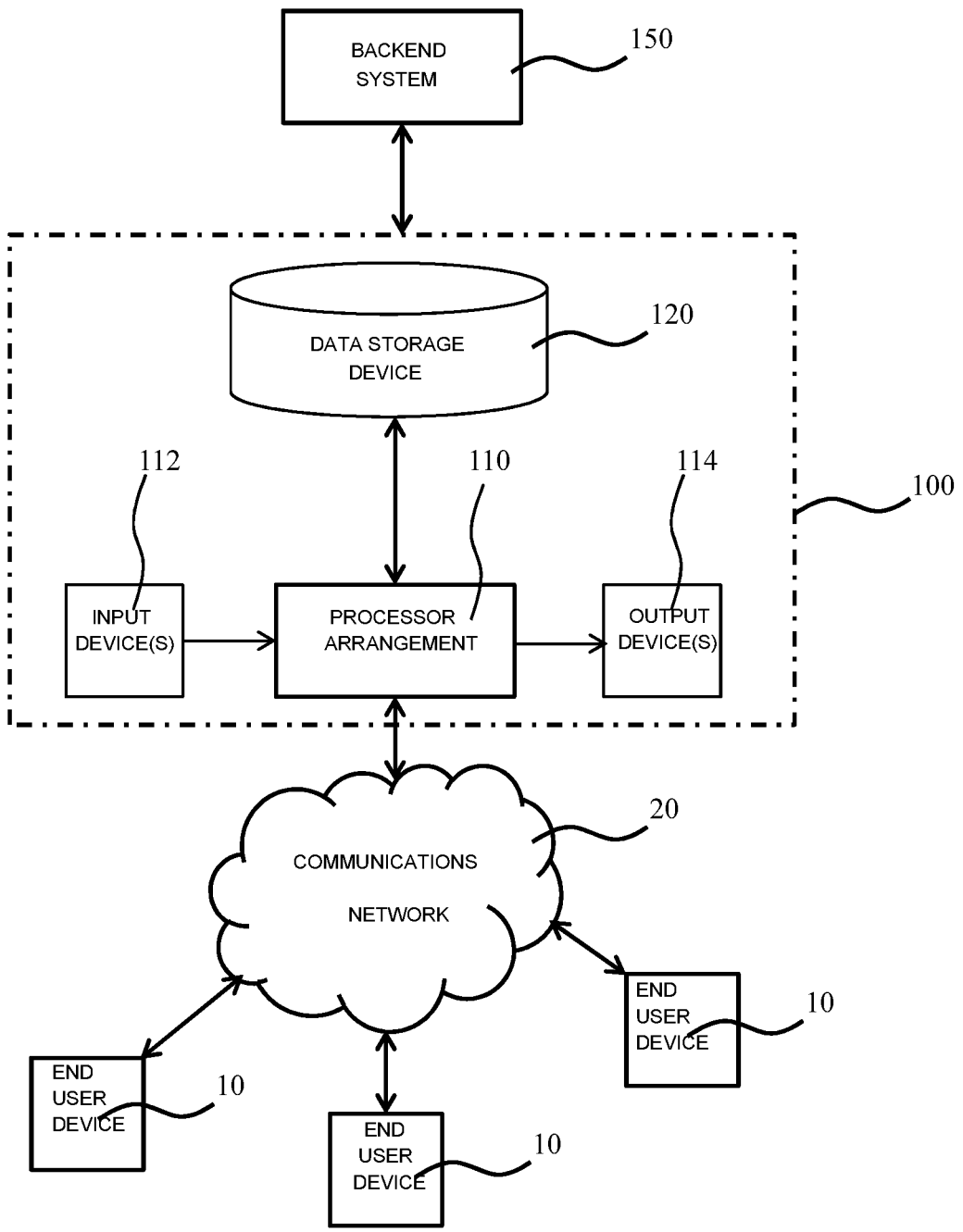
FIG. 1 schematically depicts a computer system according to an embodiment.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

FIG. 1 schematically depicts a computer system 100 according to an embodiment. The computer system 100 according to an embodiment comprises a processor arrangement 110, which processor arrangement may comprise one or more processors arranged to cooperate with each other in any suitable manner in order to provide the processing functionality of the computer system 100. Any suitable type of processor may be used for the processor arrangement 110, such as for example single core processors, multi-core processors, application-specific integrated circuits, and so on. The processor arrangement 110 may also be referred to as the CPU arrangement of the computer system 100.

The computer system 100 may further comprise one or more data storage devices 120 (here symbolized by a single device by way of non-limiting examples only), which data storage devices 120 may be any suitable data storage device such as a read-only memory, a random access memory, a Flash memory, a solid state disk or disk array, an optical disc or disk array, a magnetic disk or disk array, which some of the data storage devices being connected to the computer system 100 via a network or cable, e.g. in the case of network-attached storage, storage area networks, cloud storage, and so on. Any suitable combination of such well-known data storage devices 120 may form part of the computer system 100. Alternatively, at least part of the data storage device(s) 120 may be external to the computer system 100, in which case the computer system 100 may be communicatively coupled to the data storage device(s) 120 using a P2P (peer-to-peer) connection, a wired or wireless network, and so on. Any suitable type of wired or wireless network may be used for this purpose.

The computer system 100 may further comprise one or more input devices 112, e.g. a keyboard, mouse, voice recognition module, touchscreen, and so on and may further comprise one or more output devices 114, e.g. a display device such as a computer monitor, an audio output device, a printing device, and so on. The computer system 100 may take any suitable shape, for example may comprise one or more computers acting as servers such as transaction servers, each computer may be individually one of a network server, an application server, or a blade server and so on acting as, e.g. hosting, one or more transaction servers. Two or more networked servers may share in the execution of at least portions of a same application, program, function, or other assemblage of programmable and executable code.

The computer system 100 may form part of a service provisioning arrangement, e.g. a transaction services provisioning arrangement in which various end user devices 10 can engage, e.g. initiate, a service such as a transaction, over computer communications network 20. The end user devices 10 may be any suitable computing device configured to engage in such communications, e.g. a portable desktop computer, a smart portable device such as a smart phone or tablet computer, a client server, and so on. The end user devices 10 may send service-related data, e.g. transaction information, to the computer system 100 over the computer communications network 20, which may be any suitable network, e.g. wired networks such as a LAN or the Internet, wireless networks such as mobile communication networks, Wi-Fi networks, and so on. The processor arrangement 110 of the computer system 100 may be communicatively coupled to the computer communications network 20 via any suitable network interface (not shown) of the computer system 100.

In some embodiments, the computer system 100 hosts or otherwise implements a transaction server mediating transactions with a backend system 150, which for example may be a remote server, a remote database management system, and so on. Alternatively, the computer system 100 may host or otherwise implement a self-contained transaction server in which such remote functionality is instead provided by the computer system 100.

Such a server may be expected to deliver a minimum level of performance or service, such as a level of service specified in a SLA. Such a service level may be quantified in any suitable manner, for example throughput time of a service request or transaction, the number of service requests or transactions the server can handle simultaneously, percentage of time that the service is available, and so on. To achieve a minimum service level, system metrics of the server typically may exhibit certain values indicative of a healthy server, i.e. a server capable of delivering the desired service level.

Such system metrics may for example require certain server components, e.g. separate functions or clusters of functions defining a functional module, to exhibit characteristics indicative of the health of the server, such as CPU usage, memory usage, and so on. In the context of aspects of the present invention, where reference is made to CPU usage, it should be understood that this may refer to the amount of available CPU capacity consumed by a server component as well as to the duration of the consumption of CPU capacity, i.e. the amount of time the processor arrangement 110 requires to complete the execution of the server component for a single service request or transaction.

In an embodiment, the computer system 100 may employ a performance monitoring module, which may be a software module executed by the processor arrangement 110 or may be a hardware component forming part of the processor arrangement 110 or being separate to the processor arrangement 110. The performance monitoring module is typically adapted to monitor a set of system metrics of the server, e.g. a transaction server, during its operation, which system metrics are indicative of the health of the server. The system metrics may be selected by a system analyst or other skilled person, e.g. using a user interface through one or more of the input devices 112 in a configuration process of the performance monitoring module.

Alternatively, the performance monitoring module may be a predictive performance module, which may include program code that when executed on the processor arrangement 110 of the computer system 100 may monitor the operation of the server, e.g. transaction server, hosted by the computer system 100, e.g. by monitoring service requests or transactions processed by the server during nominal operating conditions in accordance with a SLA for the server. For example, the performance monitoring module may create a first timestamp according to a clock (not shown) of the computer system 100 when a transaction enters the logic of a particular one of the components of the server and may create a second timestamp upon completion of the transaction by the particular one of the components of the transaction server so as to determine a total time during which each transaction is pending in the transaction server, i.e. a CPU usage of the component during nominal operation. The timestamps and/or the CPU usage in turn may be stored in a metric store in the data storage device 120.

In this manner, the performance monitoring module may build a library of system metrics for the various components of the server associated with handling a service request or transaction during nominal (healthy) operation of the server, e.g. a transaction server. This library of known good system metrics may be used to compute a benchmark for each of the monitored server components, for example by calculating a running average of time during which a transaction pends in a corresponding one of the components of the server during its nominal operation. This running average may be defined as a threshold or median value indicative of the known good processing behavior of the monitored component.

A threshold variance may be calculated and defined, for example from the individual entries in the library of system metrics for the relevant server component, to define a tolerance for the threshold or median value, i.e. an amount by which the particular system metric may deviate from its threshold or median value before the system metric is considered to indicate a deviation from healthy operation for the server. Alternatively, such a threshold variance may be user-defined. The benchmark including the threshold or median values for the various server components and optionally including the associated threshold variances of these threshold or median values may be stored in any suitable location accessible by the performance monitoring module, e.g. the data storage device 120.

Figure 2:
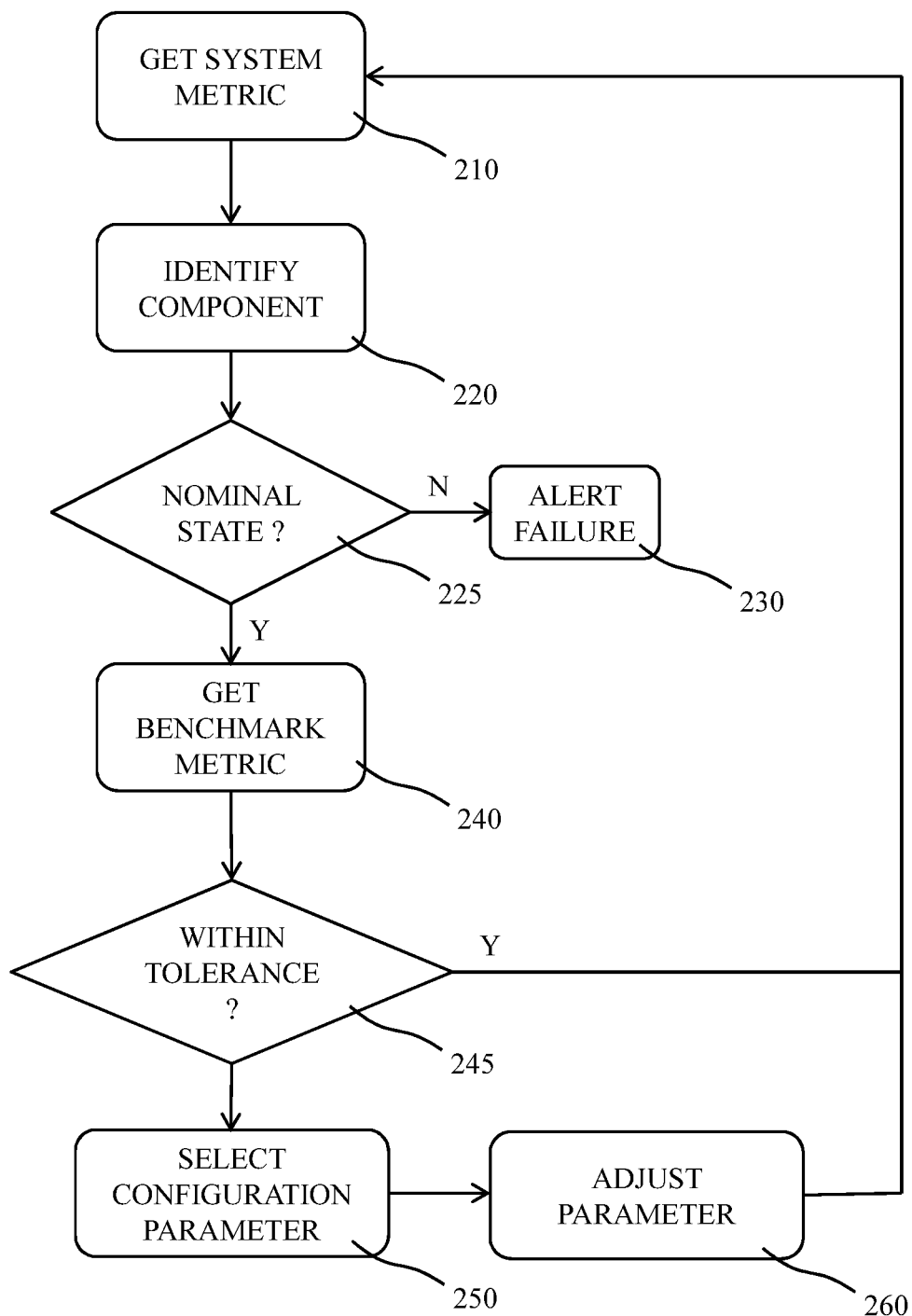
FIG. 2 is a flowchart of a method according to an embodiment.

The thus created benchmark may be subsequently used by the performance monitoring module to monitor the health of the server, e.g. the transaction server, hosted by the computer system 100. This is explained in more detail with the aid of FIG. 2, which depicts a flowchart of a monitoring method 200 implemented by the performance monitoring module. During server performance monitoring, the performance monitoring module may monitor a system metric in block 210, e.g. by creating timestamps at the beginning and end of the execution of a server component as previously explained, which triggers the performance monitoring module to identify the server component associated with the monitored system metric in block 220. Next, the performance monitoring module may check in block 225 if the monitored server operates in a nominal state, e.g. in accordance with a desirable level of service, such as for example an applicable SLA, which if this is not the case may trigger the performance monitoring module to generate an alert in block 230 that indicates the failure, i.e. unhealthy state of the monitored server, e.g. on one or more output devices 114 of the computer system 100, in the form of a mail message, etcetera, to allow a systems manager or a similar skilled person to intervene in order to restore the health of the server, e.g. a transaction server, hosted by the computer system 100.

In the absence of optional block 225, or in case it is determined by the performance monitoring module in block 225 that the server operates in a nominal state, the performance monitoring module may retrieve the system metric from the stored benchmark belonging to the identified server component in block 240 and may compare the monitored system metric against the benchmark system metric in block 245 to determine if the monitored system metric corresponds to the benchmark system metric, e.g. falls within a defined threshold variance associated with the benchmark system metric. If this is the case, the performance monitoring module may revert back to block 210 in which the system metric for the next component or transaction is monitored.

On the other hand, if the performance monitoring module determines in block 245 that the monitored system metric does not correspond to the benchmark system metric, e.g. falls outside a defined threshold variance associated with the benchmark system metric, the performance monitoring module may select one or more configuration parameters associated with the monitored server component in block 250 and adjust the one or more configuration parameters of the components 240 programmatically in block 260, for example according to a pre-programmed rule or value before reverting back to block 210.

In this manner, the performance monitoring module may identify symptoms of the monitored server progressing towards non-nominal performance, i.e. an unhealthy state, and may autonomously attempt to revert such trends by adjusting selected operating parameters of the monitored server components exhibiting performance (i.e. system) metrics deviating from benchmark metrics for such components, e.g. by exhibiting system metrics deviating from benchmark system metrics by more than a defined threshold variance.

As will be readily understood, once the benchmark of system metrics has been created for the server hosted by the computer system 100, such a performance monitoring module can maintain the server in a nominal or healthy state. However, during the deployment of new instances of such servers, it is not straightforward to ensure that the new instance of such a server operates in a nominal state, for example because the server is hosted on a computer system having a different hardware architecture, e.g. a different processor arrangement or CPU arrangement compared to the computer system 100 on which the server is hosted. Therefore, a system operator or similar skilled person configuring a new instance of such a server on a target computer system may be unsure if a server instance has been correctly deployed on the target computer system in the absence of knowledge of the 'known good' system metrics of the server hosted by the computer system 100 and captured in the benchmark of system metrics stored in data storage device 120.

Figure 3:
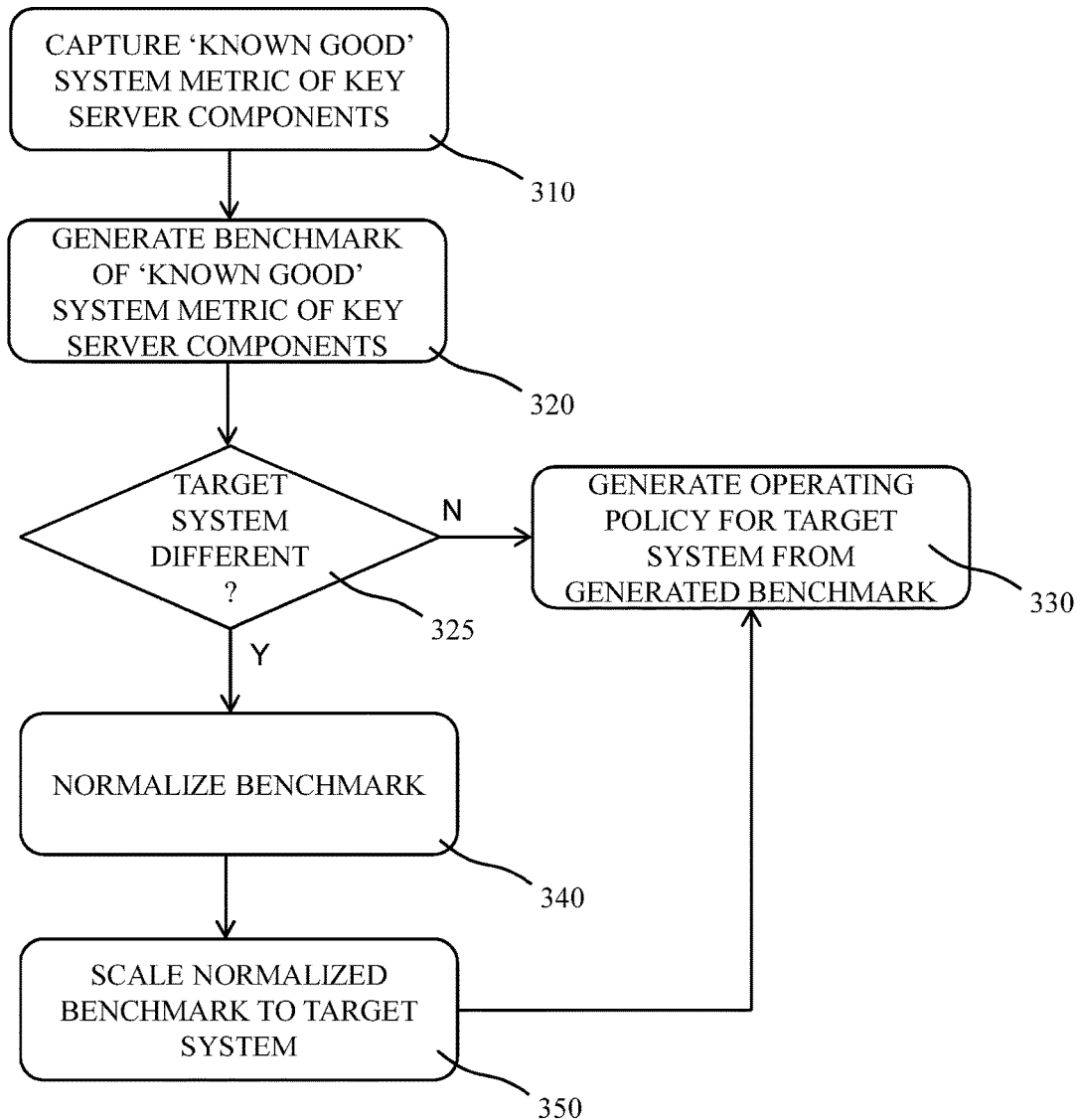
FIG. 3 is a flowchart of a method according to another embodiment.

According to an embodiment, the computer system 100 is further configured to employ operating policy generation method 300, a flowchart of which is depicted in FIG. 3. In block 310, the computer system 100 hosting the server, e.g. a transaction server, may monitor a plurality of system metrics of the server hosted by the computer system 100, e.g. a first transaction server, during nominal operation of the server to capture a set of system metrics indicative of healthy server operations as explained in more detail above. This may be achieved by the performance monitoring module for instance, or in any other suitable manner. The monitored system metrics may be identified by the performance monitoring module or may be user-selected, e.g. by a system operator, analyst or the like.

The computer system 100 may subsequently compile a benchmark of desirable, i.e. known good, system metrics from the system metrics captured by the performance monitoring module during the nominal operation of the server in block 320, which benchmark may further include threshold variances, i.e. tolerated deviations from the threshold or median values, for the known good or desirable system metrics as monitored by the performance monitoring module in block 310, which benchmark may be stored in any suitable location, e.g. in the data storage device 120.

The thus stored benchmark may be used to generate an operating policy for another instance of the server, i.e. a second server such as a second transaction server, to be hosted by a target computer system. Such an operating policy for example may include the key system metrics indicative of healthy performance of the server instance as stored in the benchmark, and may further include the acceptable threshold variances of these key system metrics such that an installer of the second server on the further computer system can compare the system metrics of the second server against the operating policy to determine if the second server exhibits nominal operation, i.e. is healthy.

The benchmark may further comprise a set of configuration parameters for the various components of the server as well as threshold variances for these configuration parameters, which configuration parameters are typically associated with the first server hosted by the computer system 100 displaying nominal and healthy operating performance. The operating policy generated from the stored benchmark may include these configuration parameters and threshold variances to further aid the installer of the second server instance on the target computer system, as the installer may configure the second server instance using the configuration parameters in the operating policy, thereby increasing the likelihood that the second server will exhibit nominal or healthy operating behavior from launch.

The computer system 100 may check in block 325 if the target computer system has a different hardware configuration to the computer system 100. In such a scenario, it may be necessary to convert the system metrics (and configuration parameters if present) in the stored benchmark for the first server into a further benchmark for the second server based on the difference between the respective hardware configurations of the first server and second server. For example, such a different hardware configuration may be reflected in the respective computer systems having different processor arrangements, e.g. different CPU architectures, which may cause server components executed on the computer system 100 to exhibit different system metrics, e.g. different CPU usage such as CPU execution times as previously explained, in which case the system metrics in the stored benchmark require scaling based on the difference between the hardware configuration, e.g. CPU architecture, of the computer system 100 and the target computer system hosting the new instance of the server.

For example, the computer system 100 may create a dialog box or the like for displaying on a display as an output device 114 in which a user can specify details of the target computer system, e.g. using one or more input devices 112, from which details the computer system 100 can determine if the stored benchmark requires scaling in order to generate the operating policy. Such a dialog box or the like in some embodiments may include a list of potential target computer systems on which the new instance of the server may be hosted, with the user being prompted to select the target computer system from this list.

If the computer system 100 determines in block 325 that the target computer system has the same hardware configuration as the computer system 100, the operating policy may be generated in block 330 by simply exporting the stored benchmark of system metrics, which may be exported in any suitable manner, e.g. in the form of an electronic file or document, on a display device, exported to a printer for generating the operating policy as a printed document and so on.

On the other hand, if the computer system 100 determines in block 325 that the target computer system has a different hardware configuration to the computer system 100, the computer system 100 may proceed to optional block 340 in which the system metrics, threshold variances and configuration parameters if present in the stored benchmark may be normalized, e.g. against some benchmark computer system, before proceeding to block 350 in which the (normalized) benchmark is scaled to the hardware configuration of the target computer system. Such scaling may be done in any suitable manner.

In an embodiment, the scaling of the stored benchmark, i.e. the system metrics, threshold variances and configuration parameters if present in the stored benchmark, is performed using a reference table in which the respective performances of the potential target computer systems may be referenced, i.e. quantified, which quantification may be a quantification normalized in respect of some benchmark computer system. An example of such a reference table is a Large Systems Performance Reference (LSPR) as for example used for IBM System z® systems. LSPR tables provide a relative processor capacity factor, which capacity factor can be used as a scaling factor for the system metrics and related parameters in the stored benchmark.

Upon scaling the stored benchmark in block 350, the computer system 100 may proceed to block 330 in which the operating policy for the target computer system is generated from the scaled benchmark. This operating policy as before may be advantageously used by an installer or programmer of the new instance of the server to ensure that the new instance of the server, e.g. a new instance of a transaction server exhibits nominal or healthy behavior as explained in more detail above.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of generating a performance policy for a server, the computer-implemented method comprising:
monitoring, by a processor, a plurality of system metrics of a first server;
storing a benchmark for said plurality of system metrics based on the monitoring the plurality of system metrics, the stored benchmark indicating desirable system metrics of the first server;
generating an operating policy for a second server from the stored benchmark, said operating policy comprising desirable system metrics of the second server based on the desirable system metrics of the first server;
executing the second server and obtaining system metrics of the second server;
using the operating policy to determine whether the second server is performing in an acceptable manner, as defined by the operating policy, the using comprising comparing the system metrics of the second server with the operating policy to determine whether the second server is performing in the acceptable manner; and wherein the first server and the second server have different hardware configurations, wherein the generating the operating policy for the second server from the stored benchmark comprises converting the stored benchmark for the first server into a further benchmark for the second server based on a difference between the respective hardware configurations of the first server and the second server, and wherein the difference between the respective hardware configurations of the first server and the second server comprises scaling respective system metrics of the stored benchmark for the first server based on a difference in CPU usage associated with respective system metrics on the first server and the second server, respectively.

2. The computer-implemented method of claim 1, wherein the first server and the second server are respective transaction servers.

3. The computer-implemented method of claim 1, wherein the first server has a first central processing unit (CPU) architecture and the second server has a second CPU architecture, and the converting the stored benchmark for the first server into the further benchmark for the second server based on the difference between the respective hardware configurations of the first server and the second server comprises scaling respective system metrics of the stored benchmark for the first server based on a difference in CPU usage associated with respective system metrics on the first CPU architecture and the second CPU architecture, respectively.

4. The computer-implemented method of claim 3, wherein the scaling the respective system metrics of the stored benchmark for the first server based on the difference in CPU usage associated with the respective system metrics on the first CPU architecture and the second CPU architecture respectively comprises:
   normalizing CPU usage on the first server for one or more functions; and
   scaling the normalized CPU usage based on a difference between the first CPU architecture and the second CPU architecture, respectively.

5. The computer-implemented method of claim 3, wherein the scaling the respective system metrics of the stored benchmark based on the difference in CPU usage associated with the respective system metrics on the first CPU architecture and the second CPU architecture respectively is performed using a reference table comprising relative processor capacity factors for a plurality of servers including the first server and the second server.

6. The computer-implemented method of claim 1, wherein the desirable system metrics of the first server include a threshold variance for at least some of the plurality of system metrics.

7. The computer-implemented method of claim 6, further comprising:
   comparing monitored system metrics against corresponding desirable system metrics in the stored benchmark; and
   adjusting operating parameters of the first server based on the monitored system metrics deviating from the corresponding desirable system metrics by more than the threshold variance associated with the corresponding desirable system metrics.

8. The computer-implemented method of claim 1, wherein the generating the operating policy for the second server from the stored benchmark comprises generating an output comprising the operating policy with the first server.

9. A computer program product for generating a performance policy for a server, the computer program product comprising:
   a computer readable storage medium readable by a processing circuit and storing instructions for execution by the processing circuit for performing a method comprising:
      monitoring, by a processor, a plurality of system metrics of a first server;
      storing a benchmark for said plurality of system metrics based on the monitoring the plurality of system metrics, the stored benchmark indicating desirable system metrics of the first server;
      generating an operating policy for a second server from the stored benchmark, said operating policy comprising desirable system metrics of the second server based on the desirable system metrics of the first server;
      executing the second server and obtaining system metrics of the second server;
      using the operating policy to determine whether the second server is performing in an acceptable manner, as defined by the operating policy, the using comprising comparing the system metrics of the second server with the operating policy to determine whether the second server is performing in the acceptable manner; and
      wherein the first server and the second server have different hardware configurations, wherein the generating the operating policy for the second server from the stored benchmark comprises converting the stored benchmark for the first server into a further benchmark for the second server based on a difference between the respective hardware configurations of the first server and the second server, and wherein the difference between the respective hardware configurations of the first server and the second server comprises scaling respective system metrics of the stored benchmark for the first server based on a difference in CPU usage associated with respective system metrics on the first server and the second server, respectively.

10. The computer program product of claim 9, wherein the first server has a first central processing unit (CPU) architecture and the second server has a second CPU architecture, and the converting the stored benchmark for the first server into the further benchmark for the second server based on the difference between the respective hardware configurations of the first server and the second server comprises scaling respective system metrics of the stored benchmark for the first server based on a difference in CPU usage associated with respective system metrics on the first CPU architecture and the second CPU architecture, respectively.

11. The computer program product of claim 10, wherein the scaling the respective system metrics of the stored benchmark for the first server based on a difference in CPU usage associated with the respective system metrics on the first CPU architecture and the second CPU architecture respectively comprises:
   normalizing CPU usage on the first server for one or more functions; and
   scaling the normalized CPU usage based on a difference between the first CPU architecture and the second CPU architecture, respectively.

12. The computer program product of claim 9, wherein the desirable system metrics of the first server include a threshold variance for at least some of the plurality of system metrics.

13. The computer program product of claim 12, wherein the method further comprises:
   comparing monitored system metrics against corresponding desirable system metrics in the stored benchmark; and
   adjusting operating parameters of the first server based on the monitored system metrics deviating from the corresponding desirable system metrics by more than the threshold variance associated with the corresponding desirable system metrics.

14. A computer system for generating a performance policy for a server, the computer system comprising:
   a memory; and
   a processor in communication with the memory, wherein the computer system is configured to perform a method, said method comprising:
      monitoring a plurality of system metrics of a first server;
      storing a benchmark for said plurality of system metrics based on the monitoring the plurality of system metrics, the stored benchmark indicating desirable system metrics of the first server;
      generating an operating policy for a second server from the stored benchmark, said operating policy comprising desirable system metrics of the second server based on the desirable system metrics of the first server;
      executing the second server and obtaining system metrics of the second server;
      using the operating policy to determine whether the second server is performing in an acceptable manner, as defined by the operating policy, the using comprising comparing the system metrics of the second server with the operating policy to determine whether the second server is performing in the acceptable manner; and
      wherein the first server and the second server have different hardware configurations, wherein the generating the operating policy for the second server from the stored benchmark comprises converting the stored benchmark for the first server into a further benchmark for the second server based on a difference between the respective hardware configurations of the first server and the second server, and wherein the difference between the respective hardware configurations of the first server and the second server comprises scaling respective system metrics of the stored benchmark for the first server based on a difference in CPU usage associated with respective system metrics on the first server and the second server, respectively.

15. The computer system of claim 14, wherein the first server has a first central processing unit (CPU) architecture and the second server has a second CPU architecture, and the converting the stored benchmark for the first server into the further benchmark for the second server based on the difference between the respective hardware configurations of the first server and the second server comprises scaling respective system metrics of the stored benchmark for the first server based on a difference in CPU usage associated with respective system metrics on the first CPU architecture and the second CPU architecture, respectively.

16. The computer system of claim 15, wherein the scaling the respective system metrics of the stored benchmark for the first server based on the difference in CPU usage associated with the respective system metrics on the first CPU architecture and the second CPU architecture respectively comprises:
   normalizing CPU usage on the first server for one or more functions; and
   scaling the normalized CPU usage based on a difference between the first CPU architecture and the second CPU architecture, respectively.

17. The computer system of claim 14, wherein the desirable system metrics of the first server include a threshold variance for at least some of the plurality of system metrics, and wherein the method further comprises:
   comparing monitored system metrics against corresponding desirable system metrics in the stored benchmark; and
   adjusting operating parameters of the first server based on the monitored system metrics deviating from the corresponding desirable system metrics by more than the threshold variance associated with the corresponding desirable system metrics.

* * * * *